Patented Dec. 16, 1947

2,432,831

UNITED STATES PATENT OFFICE 2,432,831

STABLE DISPERSIONS OF AROMATIC AMINES

Bernard M. Sturgis, Pitman, N. J., and Arthur A. Baum, Wilmington, Del., assignors to E. I. du Pont de Nemours & Company, Wilmington, Del., a corporation of Delaware No Drawing. Application January 4, 1945, Serial No. 571,364

8 Claims. (Cl. 252—363.5)

This invention relates to the preparation of stable dispersions of secondary aromatic amines which are particularly useful as antioxidants in the elastomer field.

The secondary aromatic amines which are employed as antioxidants in the rubber and synthetic rubber industries, when employed with rubber latices or other aqueous dispersions of synthetic elastomers are preferably incorporated in such latices as aqueous dispersions. These aqueous dispersions of the amines are prepared with the aid of dispersing agents by the methods usually employed for dispersing solids in liquids. Ordinarily, the aromatic amine antioxidant dispersion is made up in concentrations of from 10% to 60% as it is to be used, and such dispersions are added to the latex in carefully measured amounts prior to the coagulation and drying of the elastomer. The aqueous dispersions of the secondary aromatic amines as heretofore employed, which are prepared from the amine with the usual dispersing agents, are often not stable, and, on standing, a deposit of the amine settles out quite rapidly. Such sedimentation makes the handling, measuring and proper addition of the amine to the latex difficult. When such settling out of the dispersion occurs, it tends to plug pumps, valves and lines. It will also be obvious that in such case the amount of antioxidant actually added to the latex cannot be accurately determined and therefore it is important, for smooth operation of the process, that stable dispersions of the antioxidants be used.

It is difficult to make stable aqueous dispersions of secondary aromatic amines by the usual methods of dispersing solids in water, such as by grinding in a ball mill or even with the use of such efficient apparatus as the colloid mill. While most of the commercial wetting or dispersing agents give improved results when added to such suspensions, even the most efficient dispersing agents often fail to produce dispersions of these secondary aromatic amines which will not settle out after short periods of standing. The addition of larger amounts of the dispersing agent does not produce the desired stability.

It is therefore an object of this invention to provide a method of producing aqueous dispersions of secondary aromatic amines with improved stability with regard to settling. A further object of the invention is to produce aqueous dispersions of secondary aromatic amines in higher concentrations than has normally been possible and which will remain dispersed when diluted in water for a sufficient time to permit suitable processing of the rubber latices with which they are incorporated.

A still further object of the invention is to produce the aromatic amine in a form which can be readily dispersed in water by the usual methods, but which will give suspensions that are more stable with regard to settling than are ordinarily obtained.

We have found that greatly improved dispersions of secondary aromatic amines can be produced by incorporating with the amine a small amount of lecithin either during the manufacture, pulverizing or flaking of the amine, and subsequently dispersing the amine so treated in water by the methods normally employed in the preparation of aqueous dispersions. Alternatively, the lecithin may be incorporated with the amine prior to or during the milling or colloidal grinding operation employed in producing the aqueous dispersion. The lecithin is preferably intimately incorporated with the amine either prior to or during the flaking or grinding of the amine, so as to put the amine in a form that can be readily dispersed in water by the user by the methods generally employed in preparing amine dispersions.

The lecithin is effective as a dispersing aid when added in amounts ranging from 0.1% to 10%, based on the weight of the amine, although practical limits for ordinary use will be from 0.1% to 3%. The lecithin functions as a dispersing aid in any of the processes wherein the secondary aromatic amine is dispersed in water or in an aqueous system with a dispersing agent. The preferred dispersing agents in such system are the soluble salts of sulfonated naphthalene compounds, although other types of dispersing agents may be employed, such as the sodium salts of sulfonated lorol or other alcohols or mixtures of the same, purified sulfolignins, and the sodium salts of aliphatic sulfonates of petroleum hydrocarbons, or similar dispersing agents. The lecithin does not appear to operate as a dispersing agent in itself, but functions as a dispersing aid where the secondary aromatic amine is dispersed in water by means of the usual dispersing agents.

This invention is applicable particularly in improving the dispersion stability of secondary aromatic amines normally used as antioxidants for rubber or other elastomers. By secondary aromatic amines, are meant organic chemical compounds containing at least one —NH— group attached to two aromatic rings. The aromatic rings may contain non-functional groups such as phenyl, benzyl, methyl, methoxy, phenoxy and chlorine. Examples of this type of compound are:

Diphenyl amine
Dinaphthyl amine
Diphenyl p-phenylene diamine
Dinaphthyl p-phenylene diamine
p-Benzyl diphenyl amine
p-Phenyl diphenyl amine
o-Methyl diphenyl amine
p,p'-Dichloro-diphenyl amine
p-Methoxy diphenyl amine
Ditolyl amine
p-Isopropoxy diphenyl amine.

The following examples are given to illustrate the invention. The parts used are by weight, unless otherwise specified.

*Example 1*

(A) 1000 parts of phenyl beta-naphthylamine were melted and flaked on a conventional drum type flaker, holding the melted material in the flaker pan at 140° to 150° C. and the surface of the drum at 90° C.

(B) This flaked material was then made into an aqueous dispersion by mixing 300 parts of it, 700 parts of distilled water and 6.0 parts of the sodium salts of the reaction product of naphthalene, formaldehyde and sulfuric acid (described in U. S. P. 1,336,759) as a dispersing agent. This mixture was ground through a Charlotte colloid mill set at 0.0055 inch clearance for 20 minutes.

(C) After the 20 minute grinding period, a 75 cc. sample of the dispersion was placed in a 100 cc. graduated cylinder, brought up to 100 cc. with distilled water, shaken vigorously, and allowed to stand for 20 minutes. After this period, 13 cc. of sediment had settled out of this dispersion. When the liquid in the cylinder was slowly poured out, this sediment remained behind in the cylinder.

*Example 2*

The flaking process was repeated exactly as in Example 1A on the same sample of unflaked phenyl beta-naphthylamine except that 1% of lecithin was added to the melted amine just prior to flaking. The flaked phenyl beta-naphthylamine containing lecithin was then dispersed in water by the same procedure as used in Example 1B. When tested for stability by the method of Example 1C, no sediment had settled out. After standing for 20 minutes the dispersion appeared unchanged.

*Example 3*

The process of Example 2 was repeated except that 0.5% lecithin was added to the phenyl beta-naphthylamine. In testing for stability as in Example 1C, when the dispersion was slowly poured from the cylinder after 20 minutes standing, only 1 cc. of sediment remained behind.

*Example 4*

The process of Example 2 was repeated except that 0.25% of lecithin was added to the phenyl beta-naphthylamine. In testing for stability as in Example 1C, when the dispersion was slowly poured from the cylinder after 20 minutes standing, only 2 cc. of sediment remained behind.

*Example 5*

20 parts of diphenyl para-phenylene diamine, 80 parts of water and 0.4 part of the sodium salt dispersing agent used in Example 1, were ground through a Charlotte colloid mill using a clearance of 0.0055 inch. The mixture soon became too thick to grind and a satisfactory dispersion could not be made. In a similar experiment using diphenyl para-phenylene diamine containing 1% lecithin (incorporated by mixing with the molten amine and flaking as in Example 1), the grinding could be carried out for the standard 20 minute period. The resulting dispersion was very stable.

*Example 6*

30 parts of di-para-methoxy diphenyl amine, 70 parts of water and 0.5 part of the sodium salt dispersing agent used in Example 1, were ground through a Charlotte colloid mill using a clearance of 0.0055 inch. The slurry almost immediately became too thick to grind and a good dispersion could not be made. In a similar experiment di-para-methoxy diphenyl amine containing 1% lecithin could be ground through the mill satisfactorily, and a very good and stable dispersion was obtained.

*Example 7*

A 25% slurry of phenyl alpha-naphthylamine, containing 2% of the sodium salt dispersing agent of Example 1 based on the amine, became too thick to grind in the Charlotte colloid mill after 10 minutes, and a satisfactory dispersion could not be obtained. In a similar experiment using phenyl alpha-naphthyl amine containing 1% lecithin, the slurry could be ground and a satisfactory dispersion was obtained.

The improvement in dispersion effected by the use of lecithin is not obtained by replacing the lecithin with commercial wetting and dispersing agents. This is illustrated by the following example.

*Example 8*

1000 gram samples of phenyl beta-naphthylamine were melted and 1% of the additive mixed in. The samples were then flaked on a drum flaker and the flaked material dispersed in water as in Example 1B and tested as in Example 1C. The results of these dispersion tests were as follows:

| Additive | cc. of Sediment after 20 min. |
| --- | --- |
| Control—no additive | 10 |
| Sodium salts of the dispersing agent used in Example 1 | 9 |
| Sodium salt of an aliphatic hydrocarbon sulfonate | 23 |
| C-cetyl betaine | 13 |
| Sodium stearate | 16 |
| Turkey red oil | 13 |
| Light petroleum oil | 20 |

The addition of lecithin as a dispersing aid makes it possible to produce greatly improved dispersions of the secondary aromatic amines. These dispersions are more stable and therefore remain useful for much longer periods of time without settling out. The aromatic amine is present in the dispersion in a much finer particle size than is ordinarily obtained, and the stable dispersions can be produced with much less of the usual dispersing agent. The dispersions have much lower viscosities for a given concentration, and therefore may be produced in much higher concentrations than could normally be produced, as more particularly disclosed in the examples.

The dispersions formed according to the present invention may be added to any aqueous dispersion of oxidizable organic materials requiring stabilization by means of secondary aromatic amines.

We claim:

1. In the process for preparing aqueous dispersions of secondary aromatic amines wherein the secondary aromatic amine is dispersed in water by means of a dispersing agent, the step which comprises incorporating in such aqueous dispersion, before the dispersion process is completed, from 0.1% to 10% of lecithin, based on the weight of the amine.

2. The process for preparing aqueous dispersions of secondary aromatic amines which comprises intimately incorporating in the secondary aromatic amine from 0.1% to 10% of lecithin, based on the weight of the amine, and dispersing the resulting product in water by means of a dispersing agent.

3. In the process for preparing aqueous dispersions of phenyl-beta-naphthylamine wherein the phenyl-beta-naphthylamine is dispersed in water by means of a dispersing agent, the step which comprises incorporating in such aqueous dispersion, before the dispersion process is completed, from 0.1% to 10% of lecithin, based on the weight of the amine.

4. The process for preparing aqueous dispersions of phenyl-beta-naphthylamine, which comprises intimately incorporating in the phenyl-beta-naphthylamine from 0.1% to 10% of lecithin, based on the weight of the amine, and dispersing the resulting product in water by means of a dispersing agent.

5. An aqueous dispersion of a secondary aromatic amine which contains a dispersing agent, and as a dispersion aid from 0.1% to 10% of lecithin, based on the weight of the amine.

6. An aqueous dispersion of phenyl-beta-naphthylamine which contains a dispersing agent, and as a dispersion aid from 0.1% to 10% of lecithin, based on the weight of the amine.

7. A secondary aromatic amine composition which, when dispersed in water by means of a dispersing agent, has improved stability with regard to settling, consisting of the secondary aromatic amine having intimately incorporated therewith from 0.1% to 10% of lecithin, based on the weight of the amine.

8. A phenyl-beta-naphthylamine composition which, when dispersed in water by means of a dispersing agent, has improved stability with regard to settling, consisting of the phenyl-beta-naphthylamine having intimately incorporated therewith from 0.1% to 10% of lecithin, based on the weight of the amine.

BERNARD M. STURGIS.
ARTHUR A. BAUM.

REFERENCES CITED

The following references are of record in the file of this patent:

UNITED STATES PATENTS

| Number | Name | Date |
| --- | --- | --- |
| 1,838,034 | Cadwell | Dec. 22, 1931 |
| 1,953,438 | Schlack | Apr. 3, 1934 |
| 2,100,714 | Hiers | Nov. 30, 1937 |
| 2,117,366 | Saunders | May 17, 1938 |
| 2,136,335 | Cramer | Nov. 8, 1938 |

OTHER REFERENCES

Du Pont Rubber Chemicals, Feb. 1943, pp. 75 and 76.